(12) United States Patent
Bansal et al.

(10) Patent No.: US 11,977,761 B2
(45) Date of Patent: May 7, 2024

(54) PREDICTIVE ALLOCATION OF EPHEMERAL CONTAINERS FOR CLOUD COMPUTING SERVICES

(71) Applicant: Salesforce, Inc., San Francisco, CA (US)

(72) Inventors: Kaushal Bansal, Pleasanton, CA (US); Rakesh Ganapathi Karanth, San Mateo, CA (US); Vaibhav Tendulkar, San Francisco, CA (US); Venkata Muralidhar Tejomurtula, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 62 days.

(21) Appl. No.: 16/798,008

(22) Filed: Feb. 21, 2020

(65) Prior Publication Data

US 2021/0263663 A1  Aug. 26, 2021

(51) Int. Cl.
*G06F 3/06* (2006.01)

(52) U.S. Cl.
CPC .......... *G06F 3/0644* (2013.01); *G06F 3/0604* (2013.01); *G06F 3/0665* (2013.01); *G06F 3/067* (2013.01)

(58) Field of Classification Search
CPC ........ G06F 3/06; G06F 3/0644; G06F 3/0604; G06F 3/0665; G06F 3/067; G06N 5/04
USPC ....................................................... 711/154
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

Baena-Garcia, et al, "Early Drift Detection Method", Departamento de Lenguajes y Ciencias de la Computacion E.T.S. Ingenieria Informatica. Universidad de Malaga, Spain, downloaded from https://www.researchgate.net/publication/245999704_Early_Drift_Detection_Method, Jan. 2006, 10 pages.

(Continued)

*Primary Examiner* — Michael Krofcheck
(74) *Attorney, Agent, or Firm* — Kwan & Olynick LLP

(57) ABSTRACT

Examples include maintaining a virtual pool of containers; receiving a request from a client for one of a plurality of services to performed; when the request includes client code, determining whether the request belongs to regular or priority queue based on two models; adding the request to an appropriate shard in the queue; getting the request from the selected one of the plurality of queues and assigning a container for the request from the virtual pool of containers, the client code to be executed in the container; and after the client code is executed in the container, deleting the container from the virtual pool.

27 Claims, 10 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,720,736 B2 * | 8/2017 | Kochunni ............ G06F 3/0659 |
| 10,628,267 B2 * | 4/2020 | Pradhan ............ G06F 11/1451 |
| 10,673,943 B2 * | 6/2020 | Pradhan ............ H04L 67/1097 |
| 10,749,813 B1 * | 8/2020 | Zhao .................... H04L 47/781 |
| 10,783,472 B2 * | 9/2020 | Carpenter ............ G06Q 50/18 |
| 10,929,247 B2 * | 2/2021 | Fair ..................... G06F 16/164 |
| 11,016,813 B2 * | 5/2021 | Filho ................... G06F 9/5038 |
| 11,068,460 B2 * | 7/2021 | Zait .................... G06F 16/213 |
| 11,113,110 B2 * | 9/2021 | Thammaiah ........ G06F 9/5061 |
| 11,122,002 B2 * | 9/2021 | Dennis ................ H04L 51/30 |
| 11,126,351 B2 * | 9/2021 | Liu ...................... G06F 3/0659 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2012/0210333 A1 * | 8/2012 | Potter .................. G06F 9/4843 719/313 |
| 2014/0328344 A1 | 11/2014 | Bosshart |
| 2016/0283274 A1 * | 9/2016 | Kochunni ............ G06F 9/5022 |
| 2018/0046926 A1 | 2/2018 | Achin |
| 2019/0286486 A1 * | 9/2019 | Ma ........................ G06F 9/5027 |
| 2019/0317697 A1 * | 10/2019 | La Fratta ............... G06F 3/0604 |
| 2020/0186445 A1 * | 6/2020 | Govindaraju ........... H04L 67/34 |
| 2020/0241903 A1 * | 7/2020 | Wang .................. H04L 61/2007 |
| 2021/0073379 A1 * | 3/2021 | Gibbs .................. G06F 21/554 |
| 2021/0157704 A1 | 5/2021 | Parthasarathy |
| 2021/0192280 A1 | 6/2021 | Zhang |

OTHER PUBLICATIONS

Brownlee, Jason, "A Gentle Introduction to Concept Drift in Machine Learning", Machine Learning Mastery, Making Developers Awesome at Machine Learning, downloaded from https://machinelearningmastery.com/gentle-introduction-concept-drift-machine-learning, Dec. 15, 2017, 17 pages.

Gama, et al, "Learning with Drift Detection", LIACC—University of Porto Rua Campo Alegre 823, 4150 Porto, Portugal, Part of the Lecture Notes in Computer Sciencebook series (LNCS, vol. 3171, downloaded from https://link.springer.com/chapter/10.1007/978-3-540-28645-5_29, Apr. 29, 2020. 10 pages.

Hochreiter, et al, "Long Short-Term Memory", Neural Computation 9(8): 1735-1780, 1997, downloaded from https://www.bioinf.jku.at/publications/older/2604.pdf, Apr. 29, 2020, 32 pages.

Office Action (Non-Final Rejection) dated May 11, 2022 for U.S. Appl. No. 16/750,892 (pp. 1-17).

* cited by examiner

PREDICTIVE ALLOCATION OF EPHEMERAL CONTAINERS FOR CLOUD COMPUTING SERVICES

BACKGROUND

The field of invention relates generally to running code provided by a client within cloud computing services, and, more specifically, to a system for predictive allocation of ephemeral containers used to isolate the client's code.

Cloud computing services provide shared resources, software, and information to computers and other devices upon request or on demand. Cloud computing typically involves the over-the-Internet provision of dynamically scalable and often virtualized resources. Technological details can be abstracted from end-users (e.g., client computing systems), who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to clients can include the ability for a user to create, view, modify, store and share documents and other files.

In some scenarios, clients may provide custom logic in the form of client-provided code to be executed in the cloud computing environment. Since this could be a security risk, the client-provided code is isolated in an ephemeral container, which is destroyed once the client-provided code has run. However, the time needed to provision an ephemeral container adds to system latency, the number of ephemeral containers active at any given time is limited, and the timing and the transitory number of containers needed for some clients may result in starvation of resources for other clients.

DETAILED DESCRIPTION

Figure 1:
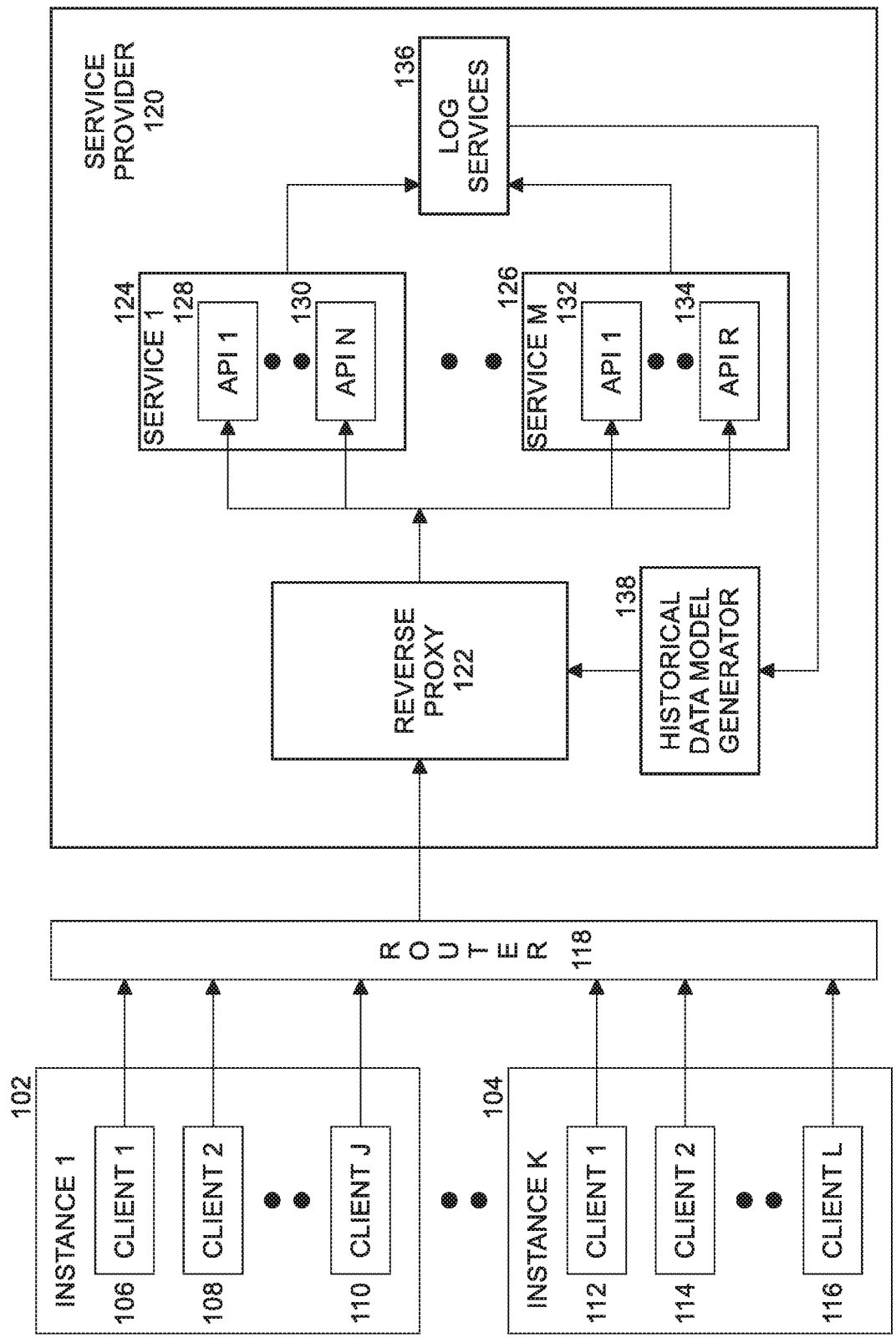
FIG. 1 illustrates a first example computing system according to some embodiments.

FIG. 1 illustrates a first example computing system 100 according to some embodiments. Computing system 100 includes a plurality of instances of client computing systems such as instance 1 102 . . . instance K 104, where K is a natural number. In an embodiment, an instance (also known as a pod) is a set of hardware and services that hosts the applications and data for a set of customer organizations (called orgs herein). A single instance can house multiple orgs. Each instance includes a plurality of clients, such as client 1 106, client 2 108, . . . client J 110 of instance 1, through client 1 112, client 2 114, . . . client L 116 of instance K 104, where J and L are natural numbers. In an embodiment, a client refers to an org hosted by a cloud service provider (CSP) (e.g., organization). An org includes an identifier representing a customer's version of a Software as a Service (SaaS) provided by the CSP and the data within an instance. Clients send requests (not shown) to access services provided by service provider 120. The number of requests sent by each customer may be any number at any time (e.g., they may be at a fixed rate, in bursts, at random, and so on). In large scale cloud computing environments, the number of requests being sent to service provider 120 may be in the thousands, tens of thousands, hundreds of thousands, or even millions per time period (e.g., per minute, per hour, per day, etc.). Service provider 120 is shown logically in FIG. 1 as a monolithic computer server, but in various embodiments service provider 120 may comprise any number of communicating computer servers in one or more data centers in any one location or more locations around the world. Requests from clients are received by router 118 and forwarded to service provider 120. In some embodiments, clients send requests to router 118 over a communications network (not shown in FIG. 1) such as the Internet.

Service provider 120 comprises a plurality of services, shown in FIG. 1 as service 1 124 . . . service M 126, where M is a natural number. Each service comprises one or more application programming interfaces (APIs). For example, service 1 124 comprises API 1 128 . . . API N 130, . . . service M 126 comprises API 1 132 . . . API R 134, where N and R are natural numbers. Each request from a client calls an API in a service in service provider 120. In embodiments, a service may perform any one or more data processing functions needed by a client. In one example, a quote calculator service determines quote and quote line prices in response to user or automated actions. In another example, a pricing guidance service uses historical quote data and product pricing trends to suggest target, norm, and floor discount amounts.

Log services 136 comprise one or more components to obtain metrics data about requests handled by services. Reverse proxy 122 receives requests from router 118, routes requests to selected services 124 . . . 126, and prioritizes some requests over the others. In an embodiment, all requests from an org can have the same priority. In an embodiment, all requests from an org for the same service can have the same priority. In an embodiment, requests from an org for a service can have different priorities. In an embodiment, requests from an org for a plurality of services can have different priorities. Historical data model generator 138 obtains historical data from log services 136 regarding previously processed requests for services and generates a historical data model for use by reverse proxy 122 in deciding the priority of a request.

Figure 2:
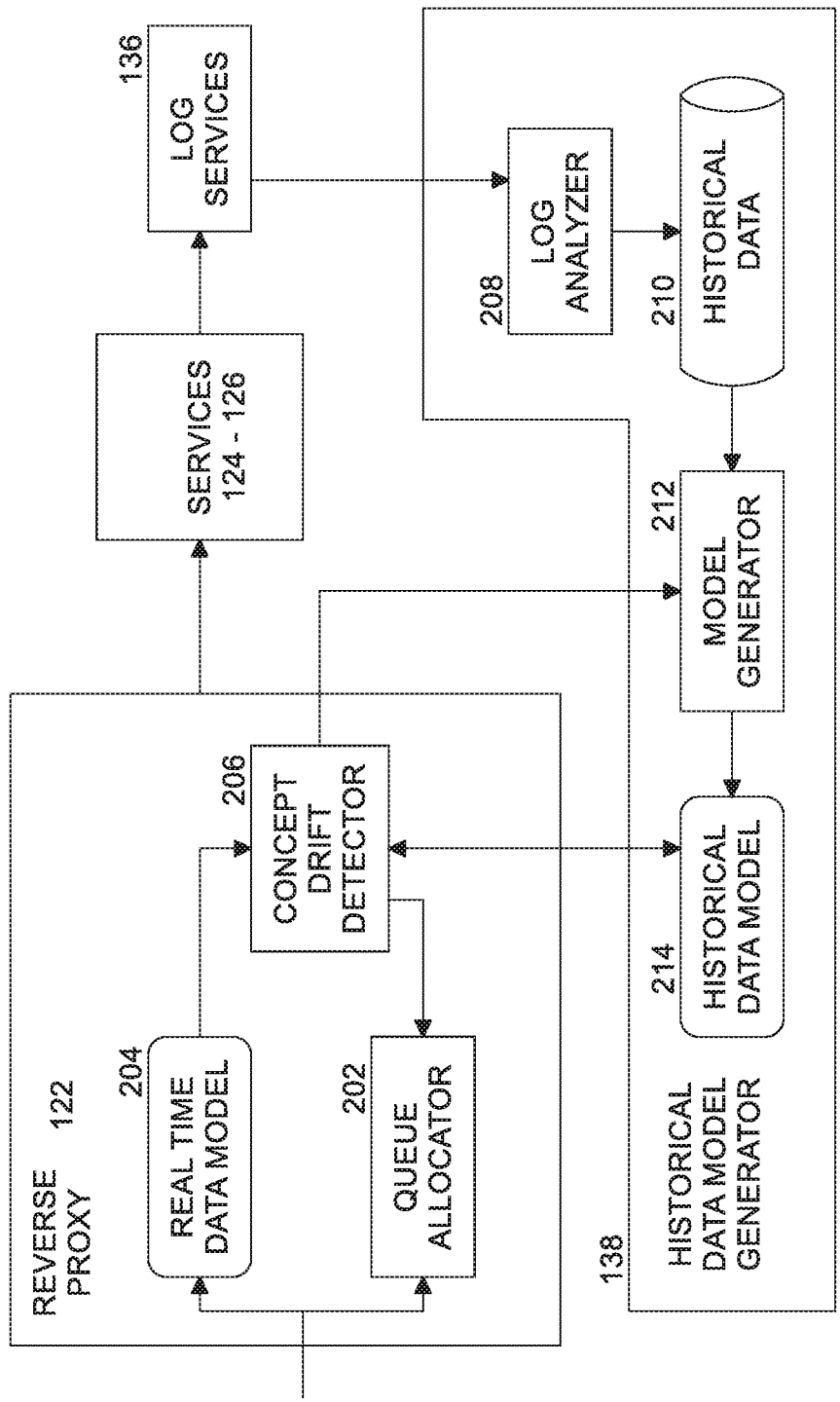
FIG. 2 is a second example computing system according to some embodiments.

FIG. 2 is a second example computing system according to some embodiments. FIG. 2 provides further details regarding service provider 120 of FIG. 1. Reverse proxy 122 includes queue allocator 202 that decides which queue an incoming request belongs to based at least in part on short-term real-time data model 204 and long-term, historical data model 214. Reverse proxy 122 begins by assuming that every client request belongs to a regular queue and promotes a request to a priority queue based at least in part on real-time traffic according to real-time data model 204 and historical request patterns according to historical data model 214. Requests in a priority queue get access to resources, in this case ephemeral containers, at a faster rate as compared to requests in a regular queue.

Log services 136 collect metrics about requests and services performed by service provider 120. In an embodiment, metrics include processing log information accumulated from one or more services.

In an embodiment, log analyzer 208 runs "cron" jobs which run predefined Domain Specific Language (DSL) based queries on metrics collected by log services 136 to generate a database of historical data 210. Historical data 210 can then be used as an input for historical data model generation. Log analyzer 208 parses log information included in the collected metrics. For example, log information could include a time series representation on what kind of API flows are called by clients, and/or a distribution of various flows based on time for different clients. Other types of log information may also be used. The timestamp of the request in log services 136 can be parsed to figure out what hour of the day and day of the week in which the request was made and this information can be stored in historical data 210. This information can be used to determine what hour of the day or day of the week the org is most likely to be active. Log parsing is responsible for removing information from log services 136 that is irrelevant to model generator 212. For example, for generating the historical model, it is not necessary to determine the body of the application programming interface (API) call, the type of response returned by the service, and how long the service took to process the request.

Parsed log information is stored in historical data 210. Since the metrics data keeps growing over time as system 100 is running, log analyzer 208 serves as a coalescing and/or filtering component in the system to only store historical data filtered from logs that is useful by historical data model generator 138. In some embodiments, historical data 210 captures all information obtained and filtered by log analyzer over a period of time (e.g., weeks, months, years, and so on). Generally, the more data collected and fed to model generator 212, the better the results of predictive allocation by queue allocator 202. Other types of log information can also be stored in historical data 210, such as frequency, type, and timing of requests; minimum, average and maximum number of requests per unit time; by client, by instance, by organization, by type, by sub-type, by API, hour of the day, day of the week, whether the day was a weekend, whether the day was a public holiday (This information would, for example, help determine whether the org is particularly active during the weekend or on a public holiday).

In an embodiment, model generator 212 is used to select a machine learning model that will be the best fit for generating historical data model 214. This process involves first dividing the historical data 210 into three sets: a training data set, a cross-validation data set and test data set. The training data set is used to train a plurality of machine learning models and tune their hyper-parameters using the cross-validation data set. In an embodiment, the model that performs "best" on the cross-validation data set is chosen as historical data model 214. The trained model is then tested using the test set data to give an unbiased estimate of performance. Measurement and comparison of performance of the machine learning models is implementation dependent and any suitable method may be used.

Over time the historical data models can become stale and the predictions may no longer be accurate. This situation requires a re-training phase which can be done in at least one of two ways. First, in one embodiment, a cron-based service can be started where historical data model 214 is re-trained on a predetermined fixed time schedule (e.g., once every few hours, once per day, etc.). Second, in another embodiment, retraining may be trigger-based, where model decay is measured by concept drift detector 206. If concept drift detector determines that the deployed historical data model 214 is stale, then predictions are no longer useful with the current version of the historical data model because the previously deployed model has not been trained to take into account newly observed data points obtained by log analyzer 208. In embodiments, determination of staleness is made by applying one of several known methods, such as "Early Drift Detection Method" by Manuel Baena-Garcia, et al., Mar. 20, 2009; "Learning with Drift Detection: by Joao Gama, et al., SBIA Brazilian Symposium on Artificial Intelligence, 2004; or "A Gentle Introduction to Concept Drift in Machine Learning" by Jason Brownlee, machinelearningmastery.com, Aug. 12, 2019. Other methods may also be used. Training (and re-training) of historical data model 214 is expensive from the standpoint of the time needed and computational resources consumed. Thus, training (and re-training) are to be performed only when necessary according to a measure of staleness.

Historical data model 214 is used to capture the time-sensitive and/or seasonality of incoming request traffic from clients and/or organizations. For example, some organizations only send in requests on weekdays during working hours of 9 am to 5 pm and are dormant the rest of the time, while other organizations send in requests at a specific time of day. Historical data model 214 captures this temporal behavior (e.g., client requests on certain days of the week) and accordingly predicts when an organization will become active based on past behavior. This is advantageous because if the historical data model gives an indication that an organization is about to send a burst of requests, the requests can then be enqueued in the priority queue.

In an embodiment, since each org exhibits unique behavior with respect to requests, a unique historical data model 214 is generated and trained for use by reverse proxy 122 in handling requests from a particular org. In one embodiment, historical data model 214 produces a binary output value. A value of 1 indicates that the request should be enqueued in a priority queue while a value of 0 indicates that the request should be enqueued in a regular queue. For example, if the historical data model observes that an org has high throughput between 10 am and 10:15 am every weekday (e.g., a certain time of day of previous requests for a service), the model will predict a value of 1 indicating that requests from this org should be enqueued in a priority queue during this time window.

The input to historical data model 214 is historical data 210 which contains features extracted by log analyzer 208. The output of the historical data model indicates the queue in which the request should be enqueued. The model which is used to predict these values depends on which model performs best in model generator 212. Some models that can be incorporated include feed forward neural networks and long short-term memory networks (LSTMs).

Both the models (historical and real time) are solving the problem of binary classification (e.g., predicting whether the request goes into a regular queue or a priority queue). The output of both models is a binary choice along with a confidence associated with the choice.

The historical data model looks at requests over a longer window of time (e.g., a day or a week). The purpose of the longer window is to capture seasonality in requests from the org. The historical data model uses time series forecasting to predict how many requests an org is going to send in the next time period (this is called a time period herein and not time window so as not to cause confusion between the two terms). Then the expected number of requests is compared to a predefined threshold. In an embodiment, this predefined threshold is set by the user based on the hardware serving capacity.

If the number of requests from an org in the current time window is less than or equal to this threshold, and if the org's requests were previously being directed to a priority queue, those requests will now be directed to a regular queue. If the org's requests were previously being directed to a regular queue, no change is necessary. If the number of requests from an org in the current time window exceeds the threshold, and if the org's requests were previously being directed to a regular queue, those requests will now be directed to a priority queue. If the org's requests were previously being directed to a priority queue, no change is necessary.

In one embodiment, for the purpose of time series forecasting, Long Short-Term Memory (LTSM) networks can be used, such as is described in "Long Short-Term Memory" by Sepp Hochreiter and Jürgen Schmidhuber, Neural Computation 9(8):1735-1780, 1997. One LSTM is trained for each org to capture the request patterns of the org. The input to the LSTM is the time series data of the requests the org has made over the long window. The output of the LSTM is the number of requests the model predicts the org will send in the next time period. This time period is a short interval (not to be confused with the training window). Since a binary classification problem is being addressed, this numeric output is fed to a sigmoid function that maps the numeric value to a binary value. As an example, the LSTM is trained with the requests from the org over the previous day and tasked to predict how many requests the org will send over the next minute. Once this prediction is obtained, the above rules are used to determine if the request should be placed in priority or regular queue.

Assume that the incoming request was made by org X. In one embodiment, the confidence of the historical data model is calculated as follows.

Confidence for output 1 (Priority)=Predicted number of requests from org $X$ in the upcoming time period/Predicted total number of requests from all orgs in the current time window.   Equation 1

Confidence for output 0 (Regular)=1−Confidence for output 1.   Equation 2

To put this into perspective, if the majority of the requests received are from org X, these requests should be prioritized and put in a priority queue. If these requests are queued in a regular queue, all might not get served as the regular queue contains requests from other low throughput orgs. In this case, the numerator of equation 1 is more, hence confidence for output 1 will be higher and consequently confidence for output 0 will be lower. Thus, the request has a higher chance of getting allocated to a priority queue.

On the other hand, if the majority of the requests received are not from org X, these requests should be deprioritized and put in a regular queue since org X has only sent in a few requests. So, if these requests are queued in a priority queue, those requests might end up clogging the queue for orgs which are currently sending in a burst of requests. In this case, the numerator of equation 1 is less, hence confidence for output 1 will be lower and consequently confidence for output 0 will be higher. Thus, the request has a higher chance of getting allocated to a regular queue.

Real time data model 204 analyzes real time requests passing through reverse proxy 122 and provides guidance to queue allocator 202 on how different clients are requesting services and how queue allocator 202 can use this guidance to determine which queue the request belongs to. This guidance is provided by the binary output of the concept drift detector 206 based on inputs from the historical data model 214 and the real time data model 204.

Real time data model 204, as opposed to historical data model 214, only considers the number of requests from each org in the current time period while making decisions as to in which queue the request should be enqueued. Thus, the real time data model has no historical knowledge about what the throughput of the org has been in the past hour, day or week.

In an embodiment, the data input to real time data model 204 is the current throughput of each org (e.g., how many requests each org has sent in the current time period (as opposed to historical data)). The current time period refers to either minutes/hours/seconds depending on the implementation. The data output from real time data model 204 (just like historical data model 214) is a binary value for each request from an org which represents the queue the request must be enqueued in.

One reason for including a real time data model (in conjunction with the historical data model) is to cause the system to be more reactive as well as predictive. The real time data model is lightweight in terms of computational resources needed and thus the output of the real time data model may be computed quickly, otherwise the latency of processing the request would be impacted. Another reason for including the real time data model in the system is to prioritize requests from an org that is experiencing an unexpected surge in traffic in the current time window which might not have been captured by the historical data model 214.

The real time data model looks at the requests that have arrived over a relatively small window of time, e.g., in the last minute, to come up with its decision. There is a predefined threshold that is set by the user based on the hardware serving capacity. If the number of requests from an org in the current time window is less than this threshold, and if the org's requests were previously being directed to a priority queue, those will now be directed to a regular queue. If the org's requests were previously being directed to a regular queue, no change is necessary. If the number of requests from an org in the current time window exceeds the threshold, and if the org's requests were previously being directed to a regular queue, those will now be directed to a priority queue. If the org's requests were previously being directed to a priority queue, no change is necessary.

The reasoning behind this is that if the number of requests from the org in the current time window are below the set threshold, the org has not bombarded the system with requests in this window and since it has few requests, those can be served in a regular queue. While if the number of requests from the org in the current time window are above the set threshold, the org has bombarded the system with requests in this window. If these requests are pushed into a regular queue, all these requests might not get served. Hence, these requests must be directed to a priority queue.

In one embodiment, the confidence of the real time data model can be calculated as follows. Assume the incoming request was made by org X:

Confidence for output 1 (Priority)=Number of requests from org $X$ in the current time window/Total number of requests from all orgs in the current time window.     Equation 3

Confidence for output 0 (Regular)=1−Confidence for output 1.     Equation 4

In a dynamically changing computing environment, changing request patterns influence how the services should be shared amongst all the clients. As used herein, concept drift means that the statistical properties of the target variable (in this case, the target variable is the binary value (e.g., the queue in which the request should be enqueued)) which the real time data model 204 and historical data model 214 is trying to predict, can change over time in unforeseen ways. This can cause problems for the system because predictions can become less accurate over time.

Real time data model 204 by design has a short term (e.g., "myopic") view of incoming requests. To counter this effect, the system includes historical data model 214 to capture nuanced service request usage patterns. For example, let's say an org sends out a burst of requests between 8 am and 8:30 am every day. At 8:00 am, since the burst of requests is yet to start, the real time data model would still predict that requests from the org should be enqueued in a regular queue. Since the historical data model 214 has access to data from a larger time window, it would curb the real time data model's responses because it anticipates the burst.

Concept drift detector 206 can also be used to detect decay and/or degradation of historical data model 214 and trigger an alert, which could be used by model generator 212 to rebuild/retrain the historical data model 214. Concept drift detector 206 dynamically determines whether the request from an org should be queued in the regular or priority queue. This decision is based on the output of real time data model 204 based at least in part on a flow of requests received in a first preceding period of time and the output of the historical data model 214 based at least in part on a flow of requests received in a second preceding period of time.

In an embodiment, the first preceding period of time is relatively short, such as ten minutes, 30 minutes, one hour, etc. In an embodiment, the second preceding period of time is relatively long, such as 12 hours, one day, two days, one week, etc. The definition of the first preceding period of time and the second preceding period of time are implementation dependent and may be set and/or changed in real time data model 204, historical data model 214, and/or concept drift detector 206.

Now that the binary classification result is known and the confidence for each output for both the historical and real time model, in an embodiment soft voting is used by concept drift detector 206 to determine the final result (e.g., queue allocation) and its associated confidence.

Final confidence for output 1 (Priority)=(Confidence for output 1 for real time data model+Confidence for output 0 for real time data model)/2     Equation 5

Final confidence for output 0 (Regular)=1−Final confidence for output 1     Equation 6

The final prediction of the concept drift detector is 1 (Priority) if the Final confidence for output 1>Final confidence for output 0 and is 0 otherwise.

One advantage of using soft voting is that it selects the classifier which is more confident with its binary classification output. If the real time data model predicts output 1 with confidence 0.4 and output 0 with confidence 0.6, while the historical data model predicts output 1 with confidence 0.8 and output 0 with confidence 0.2, even though both models are predicting different outputs, the historical data model is more confident in its output than the real time model, hence that is what the soft voting will predict, since final confidence for output 1=(0.4+0.8)/2=0.6 and final confidence for output 0=1−0.6=0.4. Hence the final classification is output 1 (priority).

Queue allocator 202 processes a request received from a client via router 118 before the request is able to access a service. The queue allocator is responsible for enqueuing the request in the appropriate queue based on the input it receives from the concept drift detector 206.

In some use cases, computing system 100 allows a client (e.g., one of client 1 106 . . . client J 110, or client 1 112 . . . client L 116) to provide custom logic to be performed as part of a service (e.g., service 1 124 . . . service M 126). In an embodiment, the custom logic is code specific to the client. In an embodiment, the client code is written in a computer programming language such as JavaScript. Services are shared across multiple orgs within the cloud computing environment as they need to support multi-tenancy. However, since the client code is inherently untrusted, execution of the client code should be performed in an isolated computing environment, such as a sandbox or container, which is then destroyed after use. This protects other components in the system from being affected by execution of the client code. In one embodiment, a container can be obtained from a public cloud service provider (such as Heroku, for example, a platform-as-a-service (PaaS) that enables developers to build, run, and operate applications in the cloud). In one embodiment, requests to obtain containers are executed on a first come, first served basis and the containers are allocated in response to the requests. As used herein, a container is an isolated execution environment for executing client code which is destroyed on completion and not used later.

However, the time needed to provision a container negatively affects system latency. The time needed to provision a new container may be as long as a few seconds or more. This is a problem when latency is expected to be only a few milliseconds. There will always be a limited number of ephemeral containers that can be provisioned and executed in parallel governed by the underlying infrastructure used by platform and cannot be increased in a scale out fashion if more requests need to be served in parallel. Further, allocation on a first come, first served basis of a large number of these ephemeral containers in a short amount of time due to a flurry of requests from one client may result in other clients being starved of containers failure to process their requests.

Therefore, embodiments of the present invention provide a method and system for predictive allocation of these ephemeral containers. The system also manages and/or maintains a virtual pool of containers and allocates a plurality of containers ahead of potential requests for usage of the containers, thereby having some containers initialized and "at the ready" when requests are received. The system manages and/or maintains this virtual pool of containers such that performance of requests and execution of client code in containers may be optimized. This is to save the bootstrap time of these ephemeral containers which could be in seconds.

Figure 3:
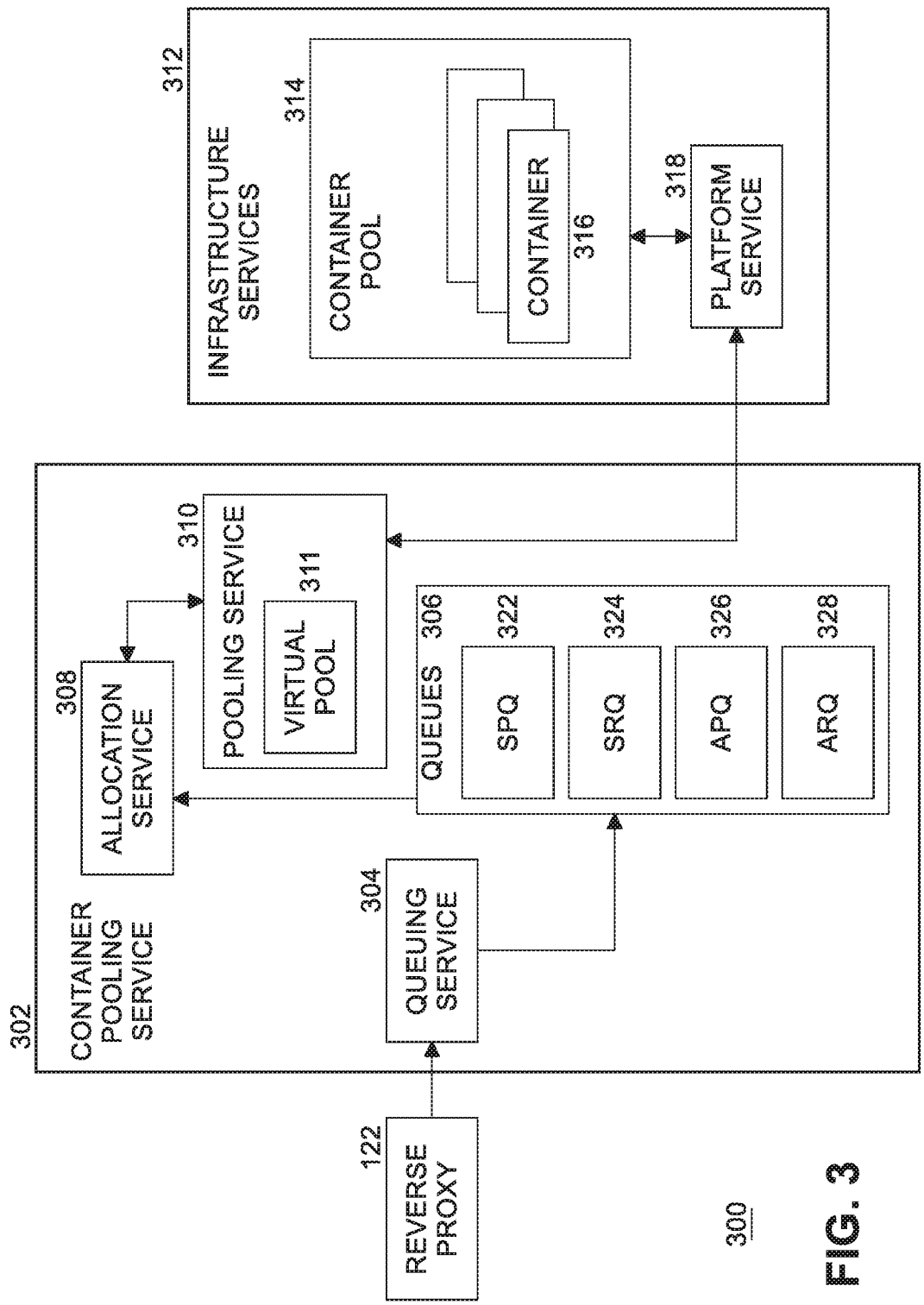
FIG. 3 is a diagram of a container pooling system according to some embodiments.

FIG. 3 is a diagram of a container pooling system 300 according to some embodiments. Container pooling service 302 includes queuing service 304, a plurality of queues 306, allocation service 308, and pooling service 310. Queueing service 304 receives client request and a recommendation from the Concept Drift Detector 206 and enqueues the request in the recommended queue among all the available queues 306. Allocation service 308 dequeues client requests from queues 306 and allocates resources (e.g., containers) maintained by pooling service 310 as a virtual pool 311 within infrastructure services 312. In an embodiment, allocation service 308 handles client requests across queues in a weighted round robin manner and according to queue priority. The user can set the weight of the priority queue as compared to the regular queue. If the weight set is 5, for example, for every request that is picked up for service from the regular queue, 5 requests are picked up from the priority queue. The allocation service is a simple service which dequeues the requests from these durable queue structures (both priority and regular) and then assigns the requests to the ephemeral containers available either in the pool by calling pooling service 310 or if the pool is exhausted, directly serving containers from platform service 318. The later approach adds to the latency of the boot time of these containers.

Infrastructure services 312 provides container pool 314, which contains a plurality of containers 316. Infrastructure services 312 creates containers 316, destroys containers, and manages access to containers in container pool 314. In one embodiment, infrastructure services 312 is the Heroku platform available from Heroku.com. The Heroku platform runs a client's applications (e.g., client code) in one or more containers 316 which execute on a reliable run-time cloud computing environment. In other embodiments, other implementations of infrastructure services providing containers other than Heroku may be used.

In embodiments, container pooling service 302 serves two kinds of application programming interface (API) requests. First, synchronous (sync) requests are client requests that timeout if not served in 30 seconds since the request is first received by service provider 120. The expectation is that these requests require simple calculations that should be completed in a few seconds or less. Second, asynchronous (async) requests are requests that may require complex, time intensive calculations and hence can take up to a few minutes (or more) to complete. For async requests, service provider 120 acknowledges the client's request with a response as soon as the request is received by the service provider with an expectation that the actual response would be returned once the requested computational task is completed. In an embodiment, handling of a sync request takes priority over handling of an async request, since sync requests timeout more quickly as compared to async ones. This can also be captured as a part of the allocation service, as now allocation service manages four of these queues and needs to decide how to prioritize them.

In one embodiment, the container pooling service 302 includes four queues. The queues have the same internal structure and hold client requests. The queues bring unfairness into the system as requests from higher priority queues are processed more frequently than lower priority queues. Queue characteristics include priority or regular and synchronous or asynchronous. The four queues used herein are 1) Sync Priority Queue (SPQ) 322, 2) Sync Regular Queue (SRQ) 324, 3) Async Priority Queue (APQ) 326, and 4) Async Regular Queue (ARQ) 328.

Allocation service 308 uses the priority while allocating containers 316 to client requests. Since there is a 30 seconds timeout for sync requests in one embodiment, and the client is waiting for the response, the sync queues (SPQ 322 and SRQ 324) don't need to be non-volatile. The sync queues can be stored in volatile memory, which can lose data across server failures. On the other hand, the async queues (APQ 326 and ARQ 328) need to be non-volatile and should be able to retain the requests across hardware failures/reboots, etc.

In some embodiments, shards are provided within a queue. A shard can be considered a queue within a queue where each shard has equal priority within that queue. Shards are created so that each shard can store requests for a plurality of orgs. Through a one-way hash function, an individual org id is always mapped to the same shard. Since the shards within a queue are of the same priority, this introduces fairness within the queue. Hence, despite the unfairness resulting from having four queues with different priorities and handling requests from one queue having priority over another queue, the use of shards within queues brings the fairness back while handling requests from one of the queues.

Consider an example scenario where there are three orgs, A, B and C, and there are no shards in each queue. Let's assume that requests from org A, B and C get mapped to different shards within SPQ 322. At time t0, org A sends in 1,000 requests which get queued in SPQ 322. At time t1 (t1>t0), org B sends in one request. At time t2 (t2>t1), org C sends in one request. Both requests from org B and org C also get queued in SPQ 322. Since 1,000 requests from org A arrived before the two requests from orgs B and C, those 1,000 requests will be served first (since the queue is a first-in-first-out data structure). This might lead to the requests from org B and org C to time out because sync requests, in one embodiment, time out 30 seconds after receipt. To mitigate this problem, multiple shards are added to each queue and requests from a particular org get mapped to the same shard. Now once 1,000 requests from org A arrive, these requests get added to shard 1, for example, in SPQ 322. Since container pooling service 302 maintains fairness across multiple shards in a single queue, once one request is served from shard 1, container pooling service serves one request from every other shard in the same queue (unless the other shards are empty). Therefore, once the request is handled from org A in shard 1, container pooling service handles one request from org B in shard 2 and one request from org C in shard 3 before picking up another request from org A in shard 1 again. This is an advantage of adding multiple shards in a single queue. The assumption that each org gets mapped to a different shard is not always implemented as that would mean the number of shards available must be equal to the number of orgs, which in some scenarios is not scalable.

Figure 4:
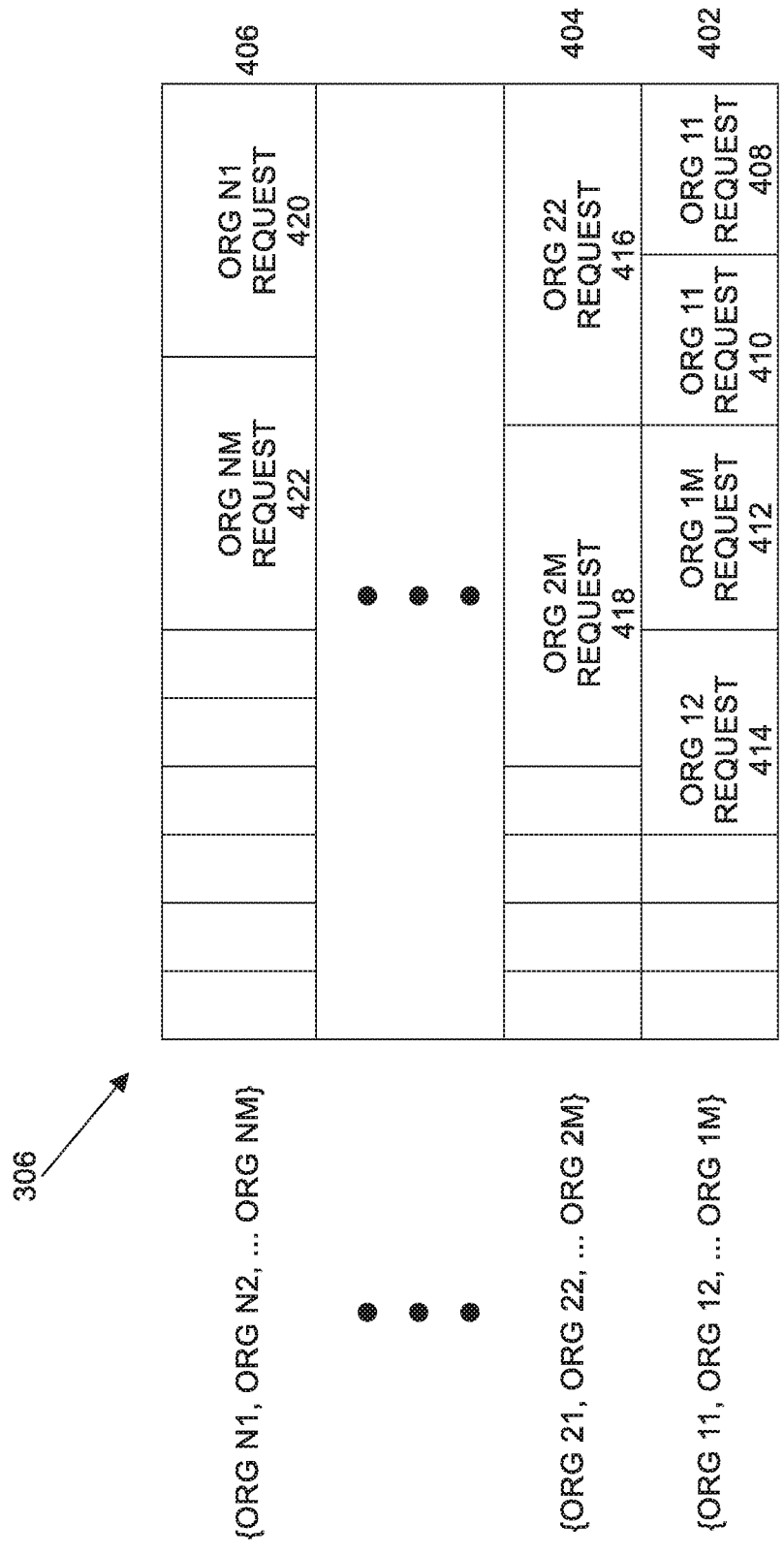
FIG. 4 is a diagram of a request queue according to some embodiments.

FIG. 4 is a diagram of a single request queue in 306 according to some embodiments. The request queue is representative of SPQ 322, SRQ 324, APQ 326, and ARQ 328. The X axis represents entries in the queue. The Y axis represents the shards where requests from orgs are queued. For example, a plurality of shards 402, 404 . . . 406 are shown in the example queue 400 of FIG. 4. Each shard can accommodate a plurality of orgs and all shards combined can accommodate all the orgs where any particular org will be queued in the same shard. In an embodiment, an org includes a unique org ID, which can be used to hash into different shards of the queue. In the example, orgs 11, 12, . . . 1M, where M is a natural number, are hashed to the first shard 402, orgs 21, 22, . . . 2M are hashed to the second shard 404 . . . , orgs N1, N2 . . . NM are hashed to the Nth shard. Each shard is a queue storing a plurality of entries, where each entry stores a client request. For example, first shard 402 stores entries for org 11 request 408, org 11 request 410, org 1M request 412, and org 12 request 414; second shard 404 stores entries for org 22 request 416, and org 2M request 418; and Nth shard 406 stores entries for org N1 420, and org NM request 422. In an embodiment, entries in queues are of variable length. In an embodiment, the length of a queue is fixed and if the queue overflows (e.g., any shard of the queue is full and another request is received for the full shard) then an error message is returned to the requesting client. In an embodiment, each of SPQ 322, SRQ 324, APQ 326, and ARQ 328 include the structure shown in FIG. 4. In other embodiments, there may be any number of queues, divided up according to any priority scheme, with each queue including any number of shards.

Figure 5:
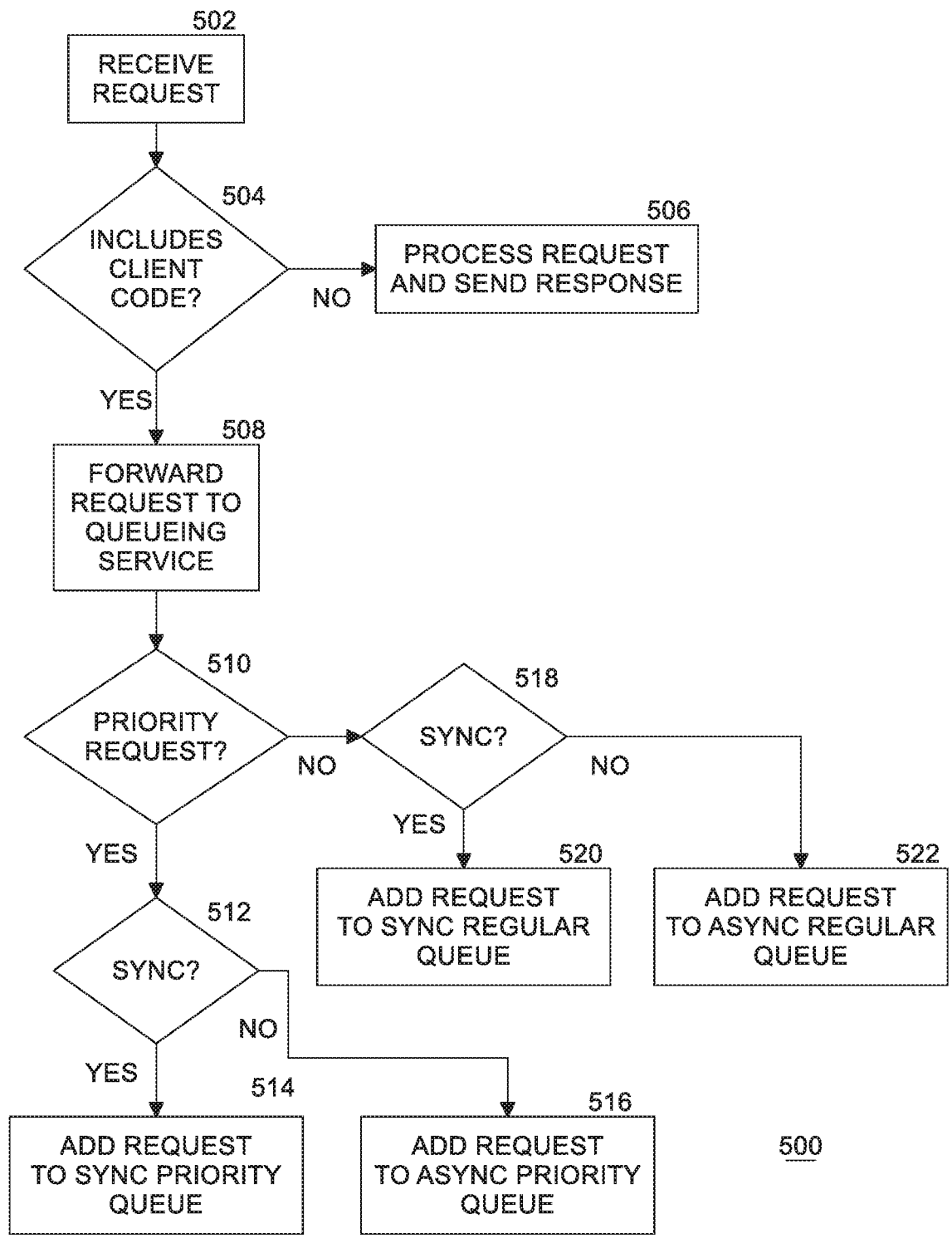
FIG. 5 is a flow diagram of container pooling service and queuing service processing according to some embodiments.

FIG. 5 is a flow diagram 500 of container pooling service 302 and infrastructure services 312 according to some embodiments. At block 502, container pooling service 302 receives a client request from reverse proxy 122. If at block 510 the request does not include client code, then container pooling service processes the request and sends a response back to the requesting client. If at block 510 the request does include client code, then the request is forwarded to queueing service 304. In an embodiment, queueing service 304 uses a binary classifier based on input data from real time data model 204 and historical data model 214 as processed by concept drift detector 206. Queuing service makes a binary choice as to whether the client request should be queued in the priority queue or the regular queue.

If the request is determined to be a priority request, at block 512, queueing service 304 determines if the request is a synchronous request by examining the API header field of the request. If request is synchronous, queueing service 304 adds the request to the sync priority queue (SPQ) 322. If the request is not synchronous, queueing service 304 adds the request to the async priority queue (APQ) 326. If the request is determined to be a regular request at block 510, then at block 518 queueing service 304 determines if the request is a synchronous request. If the request is synchronous, queueing service 304 adds the request to the sync regular queue (SRQ) 324. If the request is not synchronous at block 518, queueing service 304 adds the request to the async regular queue (ARQ) 328. In each case, queueing service 304 adds the request to the shard of the queue associated with the org to which the client belongs.

Thus, a request is classified as either a synchronous request or an asynchronous request, and as either a priority request or a regular, non-priority request.

In one example, assume at time t0 there are no requests in queues 306 but service provider 120 has historical data 210 describing the historical pattern of client requests. If sync requests are then received from three orgs such as Org 11, Org N1 and Org NM of FIG. 4, the binary classifier of queueing service 304 would determine that the requests are not prioritized and add the requests to SRQ 324 in shards based on the org ID (e.g., Org 11, Org N1, and Org NM). In FIG. 4, Org N1 and Org NM share the same shard N 406, while Org 11 is in a different shard (shard 1 402). Allocation service 308 performs a priority-based look up operation across the plurality of queues SPQ 322, SRQ 324, APQ 326, and ARQ 328, and starts picking up requests from SRQ 324 across different shards in a round robin fashion so that the client requests among Org 11, Org N1 and Org NM are served fairly. Allocation service 308 calls pooling service 310 to allocate the necessary containers and forwards the requests to be executed in the container.

At a later point in time, assume an accumulation of client requests in queues 306 is observed by allocation service 308. Assume that suddenly there is a flurry of requests that comes from Org 21. If the allocation service continues serving the requests in the above-mentioned fashion, container pooling service 302 will be providing a fair allocation of resources across all the orgs currently served. But since now an unfair allocation between the Org 21 and other orgs is desired (in order to more efficiently process the flurry of requests from a single org), the concept drift detector, based on data from both of the machine learning systems (e.g., historical data model 214 and real time data model 204), will predict output 1 (priority queue) and will start queueing requests in SRQ 324 to bring in unfairness and give priority to requests from Org 21 over other orgs. The unfairness is due to the fact that a weighted round robin method is used to pick requests between priority and regular queues, which means for each request getting picked from the regular queue, multiple requests will be picked up from the priority queue. This results in serving one "greedy" org, Org 21, more than the other orgs.

Since allocation service 308 gives priority to the requests in the priority queues such as SPQ 322, more requests from Org 21 will now be served. Now assume another flurry of requests comes from Org N2. Queueing service 304 will start queueing requests for Org N2 in SPQ 322. But the org Ids N2 and 21 get hashed to different shards. So now the allocation service would pick up more requests from the priority queues over the regular queues bringing in unfairness between the types of queues, but the requests within the priority queue (e.g., SPQ 322) will be picked in round robin fashion, keeping fairness within the priority queue. Hence, both Org N2 and Org 21 will be served with equal priority (e.g., fairness within SPQ 322) although more of their requests would be served than requests by Org 11, Org N1 and Org NM (e.g., unfairness across queue types), which are in SRQ 324.

Turning back to FIG. 3, pooling service 310 obtains allocation of containers 316 from container pool 314. In one example computing environment, it takes four to six seconds of boot time after submission of a container request before a container is made available to the requesting client (e.g., to run the client's code in the allocated container). Thus, in embodiments of the present invention, pooling service 310 predictively obtains a plurality of containers as a "hot standby" set of containers, which can be allocated to a requesting client as needed. This saves four to six seconds in an average scenario for the boot up time and overall computations/processing done by the client code. For synchronous requests this is advantageous.

Pooling service 310 is a wrapper service. A wrapper doesn't maintain the life cycle of these ephemeral containers. The pool is instantiated beforehand, thereby saving the bootstrap time. This is an optimization done to improve the latency. Pooling service 310 is a wrapper built around the infrastructure service 312, which requests allocation of containers "up front", maintains communication with the containers, and creates a virtual pool 311 in pooling service 310 from which the pooling service can allocate containers to clients as needed. Pooling service 310 creates handles for the containers, maintains a heartbeat mechanism to keep the containers active, provides the containers to allocation service 308 when requested, replenishes virtual pool 311, and maintains a quota of available containers. In an embodiment, the quota represents the number of containers to be kept in the virtual pool at any point of time. In an embodiment, virtual pool 311 is a data structure storing information needed by pooling service 310 to maintain available containers.

Figure 6:
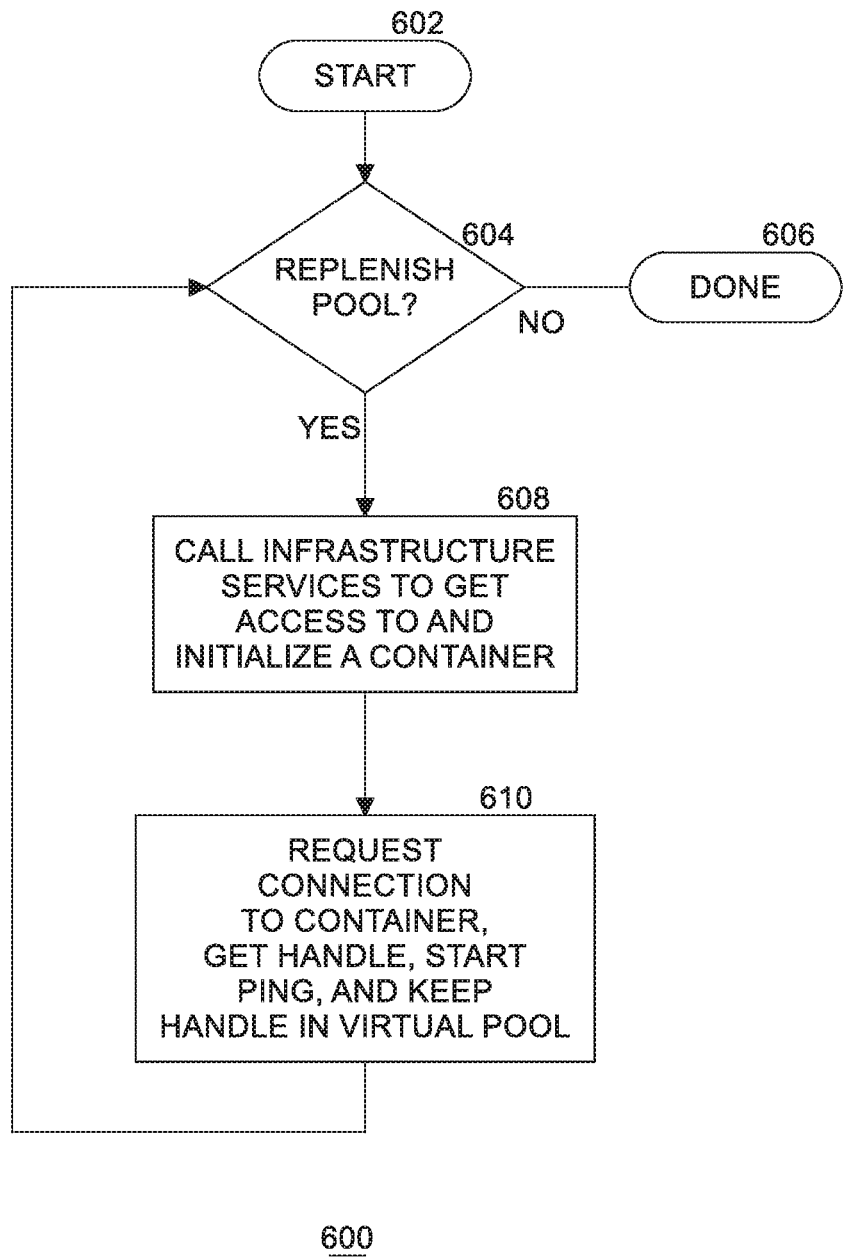
FIG. 6 is a flow diagram of container pool replenishment processing according to some embodiments.

FIG. 6 is a flow diagram 600 of container pool replenishment processing by pooling service 310 according to some embodiments. Pooling service 310 maintains a virtual pool of containers. Virtual pool 311 stores information necessary to manage, maintain, and access active containers in container pool 314. The information includes at least connection information and handles for containers. After start 602, pooling service 310 determines if virtual pool 311 of available containers needs to be replenished at block 604. Under normal operating conditions, pooling service 310 provides an implementation dependent minimum number of available containers. If all containers are in use during peak operating conditions, then subsequent requests for containers will fail until some existing containers are destroyed and new containers are created. If the virtual pool does not need to be replenished at this time, processing ends at 606. In an embodiment, pooling service checks the replenishment status periodically. In another embodiment, pooling services checks the replenishment status whenever one or more containers are assigned or whenever an implementation dependent number of containers are assigned (e.g., five, 10, 20, etc.). If virtual pool 311 does need to be replenished, then at block 608 pooling service 310 calls infrastructure services 312 to get access to and initialize a container 316. At block 610, pooling service 310 requests a connection to the container from infrastructure services 312, gets a handle for the container, starts a ping to infrastructure services 312, and keeps the handle in virtual pool 311 managed by the pooling service. Ephemeral containers need to ping the infrastructure services 312 in timely fashion to indicate that they are still being used. If this is not done, infrastructure services 312 will reclaim the containers. Processing continues with another replenishment check at block 604. When a desired minimum number of available containers are in virtual pool 311, processing ends at block 606.

Figure 7:
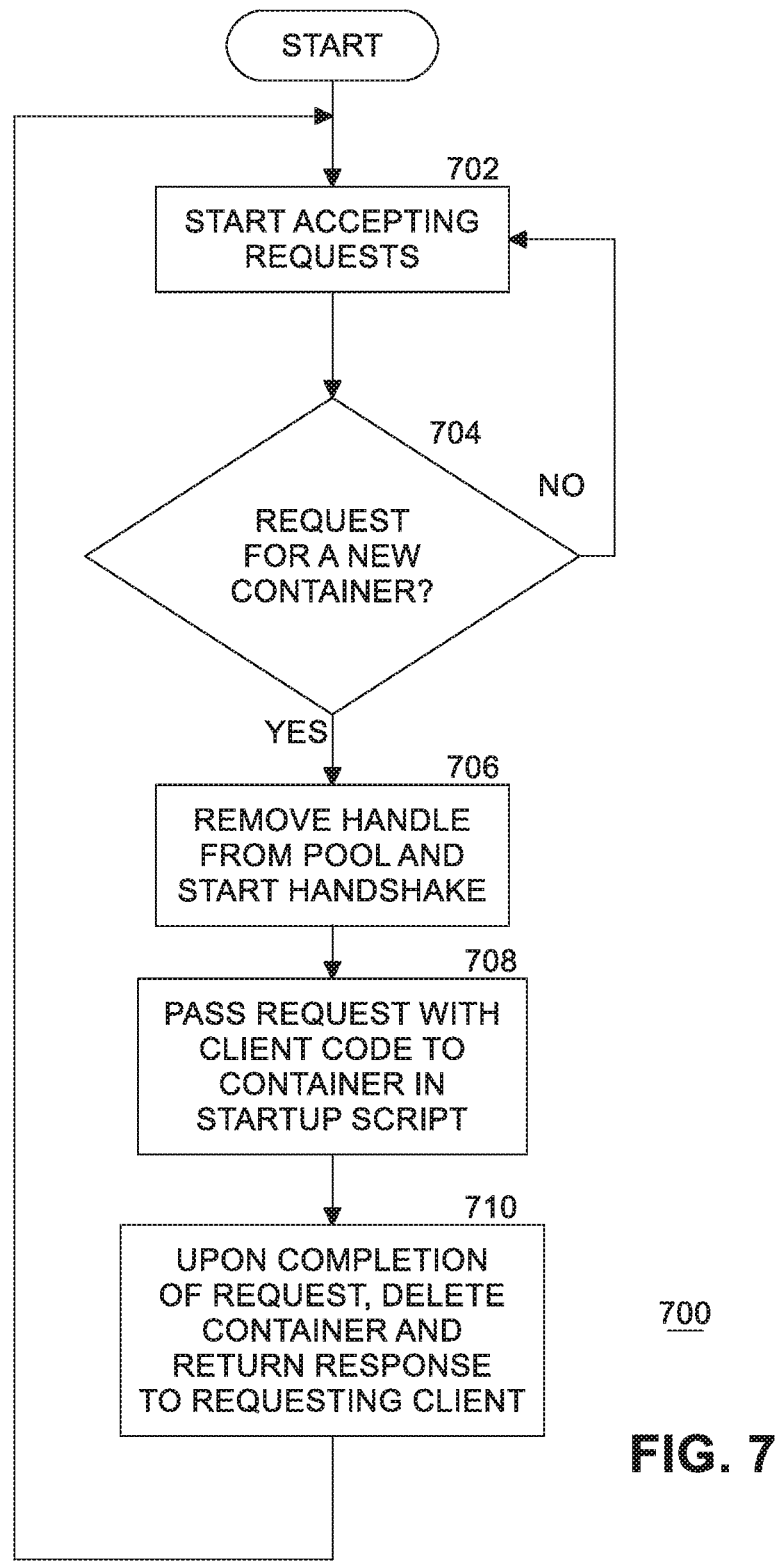
FIG. 7 is a flow diagram of pooling service processing according to some embodiments.

FIG. 7 is a flow diagram 700 of pooling service 310 processing according to some embodiments. At block 702, pooling service starts accepting requests from allocation service 308 for containers. At block 704, if a request for a new container is received, then at block 706, pooling service 310 assigns an available container to the client request, removes the handle for the container from virtual pool 311 (managed by the pooling service) and starts a handshake with the container. At block 708, pooling service 310 passes the request with the client code to the newly assigned container. In an embodiment, the request passing is performed using a startup script (e.g., an entry point in the code flow describing how to serve the request). At block 710, upon completion of the request (e.g., the client code has completed execution in the container), pooling service 310 deletes the assignment of the container to the request in virtual pool 311, requests platform service 318 to destroy the container from container pool 314, and returns a response to the requesting client.

Figure 8:
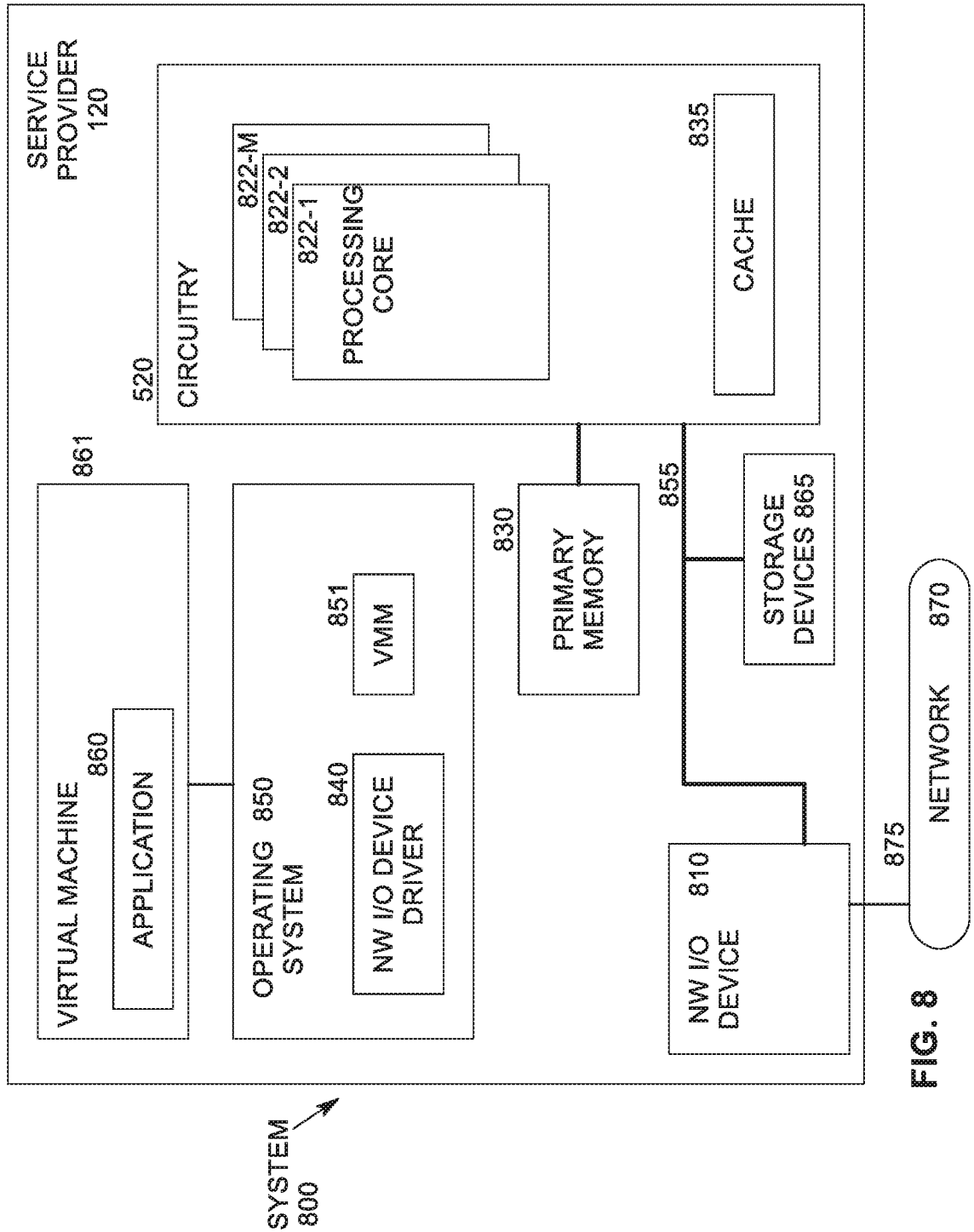
FIG. 8 illustrates an example computing system according to some embodiments.

FIG. 8 illustrates an example computing system 800. As shown in FIG. 8, computing system 800 includes a service provider 120 coupled to a network 870 (which may be the Internet, for example). In some examples, as shown in FIG. 8, service provider 120 is coupled to network 870 via network communication channel 875 and through at least one network (NW) input/output (I/O) device 810. In an embodiment, network I/O device 810 comprises a switch, a network interface controller (NIC) having one or more destination ports (not shown) connected or coupled to network communication channel 875. In an embodiment, network communication channel 875 includes a PHY device (not shown). In an embodiment, network I/O device 810 includes an Ethernet NIC. In an embodiment, network I/O device 810 comprises router 818. Network I/O device 810 transmits data packets from service provider 120 over network 870 to other destinations (such as instances and/or clients) and receives data packets from other destinations (such as instances and/or clients) for forwarding to service provider 120.

According to some examples, service provider 120, as shown in FIG. 8, includes circuitry 820, primary memory 830, operating system (OS) 850, NW I/O device driver 840, virtual machine manager (VMM) (also known as a hypervisor) 851, at least one application 860 running in a virtual machine (VM) 861, and one or more storage devices 865. In one embodiment, OS 850 is Linux™. In another embodiment, OS 850 is Windows® Server. Other OSs may also be used. In an embodiment, application 860 comprises one or more of reverse proxy 122, historical data model generator 138, services 124-126 (including container pooling service 302), and log services 136. Network I/O device driver 840 operates to initialize and manage I/O requests performed by network I/O device 810. In an embodiment, packets and/or packet metadata transmitted to network I/O device 810 and/or received from network I/O device 810 are stored in one or more of primary memory 830 and/or storage devices 865.

In at least one embodiment, storage devices 865 may be one or more of hard disk drives (HDDs) and/or solid-state drives (SSDs). In an embodiment, storage devices 865 may be non-volatile memories (NVMs). In some examples, as shown in FIG. 8, circuitry 820 may communicatively couple to network I/O device 810 via communications link 855. In one embodiment, communications link 855 is a peripheral component interface express (PCIe) bus conforming to version 3.0 or other versions of the PCIe standard published by the PCI Special Interest Group (PCI-SIG).

In some examples, operating system 850, NW I/O device driver 840, VM 861, and application 860 are implemented, at least in part, via cooperation between one or more memory devices included in primary memory 830 (e.g., volatile or non-volatile memory devices), storage devices 865, and elements of circuitry 820 such as processing cores 822-1 to 822-m, where "m" is any positive whole integer greater than 2. In an embodiment, OS 850, VMM 851, NW I/O device driver 840, VM 861 and application 860 are executed by one or more processing cores 822-1 to 822-m.

In some examples, service provider 120, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, service provider 120 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 820 having processing cores 822-1 to 822-m may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 820 may include at least one cache 835 to store data.

According to some examples, primary memory 830 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 830 may include one or more hard disk drives within and/or accessible by service provider 120.

Figure 9:
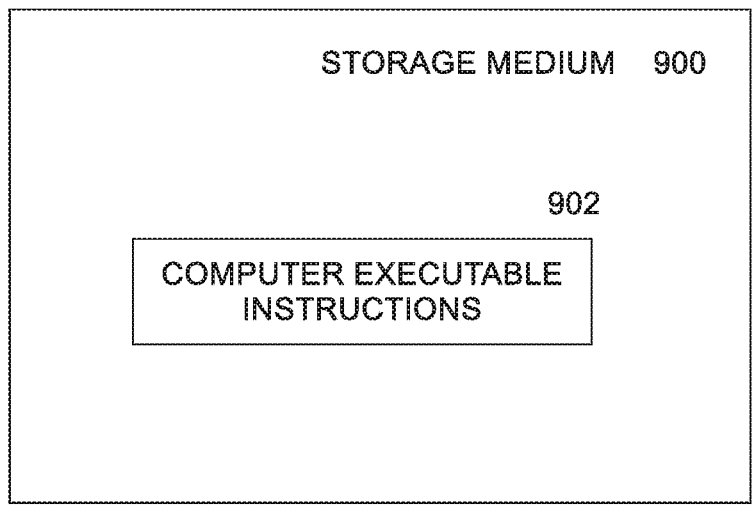
FIG. 9 illustrates an example of a storage medium.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions 902 to implement logic flows described above in FIGS. 1 through 7. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
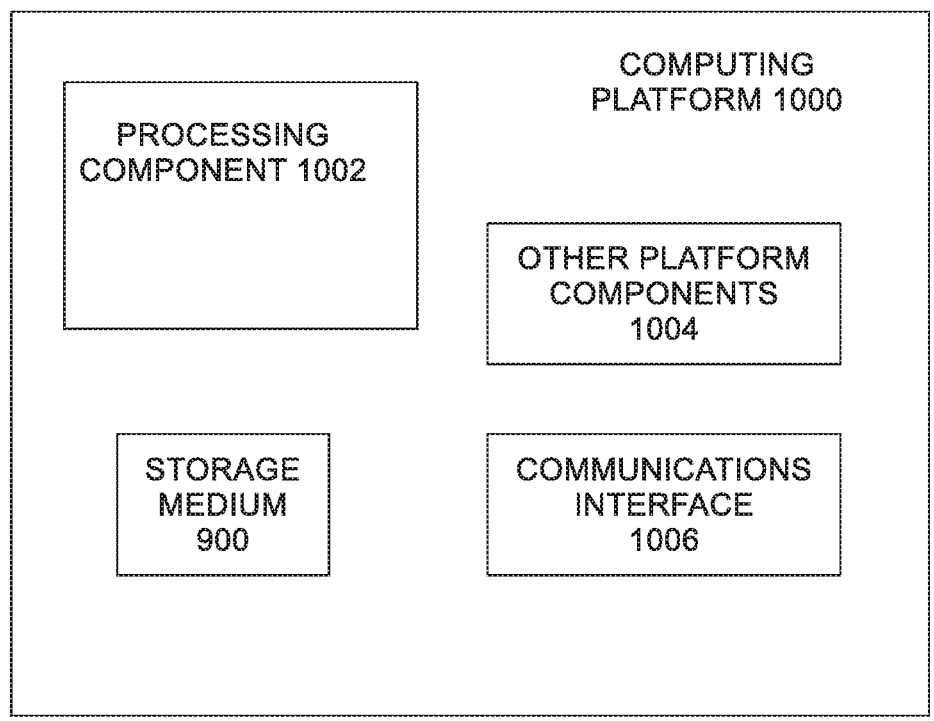
FIG. 10 illustrates another example computing platform.

FIG. 10 illustrates an example computing platform 1000. In some examples, as shown in FIG. 10, computing platform 1000 may include a processing component 1002, other platform components 1004 and/or a communications interface 1006.

According to some examples, processing component 1002 may execute processing operations or logic for instructions stored on storage medium 900. Processing component 1002 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1004 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1006 may include logic and/or features to support a communication interface. For these examples, communications interface 1006 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1000, including logic represented by the instructions stored on storage medium 900 may be implemented using any combination of discrete circuitry, ASICs, logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying Figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processing device; and
a memory device coupled to the processing device, the memory device having instructions stored thereon that, in response to execution by the processing device, cause the processing device to:
maintain a virtual pool of containers;
predictively allocate, based on historical data models, one or more containers for usage ahead of receiving requests for usage of the one or more containers, wherein the one or more containers are ephemeral containers;

receive a request from a client for one of a plurality of services to performed;

when the request includes client code, store the request in a selected one of a plurality of queues, wherein selection of one of the plurality of queues is based on the historical data models;

get the request from the selected one of the plurality of queues and assign a container among the one or more containers predictively allocated for the request from the virtual pool of containers, the client code to be executed in the container, and the container has not previously executed any request; and responsive to completion of execution of the client code in the container, delete the container from the virtual pool.

2. The apparatus of claim 1, wherein the container comprises an isolated execution environment for executing the client code.

3. The apparatus of claim 1, wherein the memory device includes instructions stored thereon that, in response to execution by the processing device, cause the processing device to:

classify the request as one of a synchronous request and an asynchronous request.

4. The apparatus of claim 3, wherein the memory device includes instructions stored thereon that, in response to execution by the processing device, cause the processing device to:

classify the request as one of as a priority request and a non-priority request.

5. The apparatus of claim 4, wherein the plurality of queues comprises a plurality of priority queues and a plurality of non-priority queues and the request is stored in the selected queue based on a priority.

6. The apparatus of claim 5, wherein the plurality of queues comprises at least one priority synchronous queue, at least one priority asynchronous queue, at least one non-priority synchronous queue, and at least one non-priority asynchronous queue, and the request is stored in the selected queue based on the priority determined at runtime using a binary classifier and whether the request is synchronous or asynchronous.

7. The apparatus of claim 6, wherein each queue of the plurality of queues comprises a plurality of shards, each shard to store requests received from a selected plurality of clients.

8. The apparatus of claim 6, wherein the at least one asynchronous priority queue and the at least one asynchronous non-priority queue are stored in non-volatile memory.

9. The apparatus of claim 5, wherein determining the selected one of the plurality of queues is based on a real time data model and an historical data model.

10. The apparatus of claim 1, wherein the memory device includes instructions stored thereon that, in response to execution by the processing device, cause the processing device to:

maintain the virtual pool of containers by assigning and initializing a plurality of new containers from a container pool, requesting connections to the new containers, getting handles for the new containers, starting pings to the new containers, and keeping the handles of the new containers in the virtual pool, when the virtual pool needs to be replenished.

11. The apparatus of claim 10, wherein the memory device includes instructions stored thereon that, in response to execution by the processing device, cause the processing device to:

allocate the container from the virtual pool for the request by removing the handle for the container from the virtual pool, starting a handshake with the container, and passing the request including the client code to the container.

12. A method to be performed by a processor in a computing system, comprising:

maintaining a virtual pool of containers;

predictively allocating, based on historical data models, one or more containers for usage ahead of receiving requests for usage of the one or more containers, wherein the one or more containers are ephemeral containers;

receiving a request from a client for one of a plurality of services to performed;

when the request includes client code, storing the request in a selected one of a plurality of queues, wherein selection of one of the plurality of queues is based on the historical data models;

getting the request from the selected one of the plurality of queues and assigning a container among the one or more containers predictively allocated for the request from the virtual pool of containers, the client code to be executed in the container, and the container has not previously executed any request; and responsive to completion of execution of the client code in the container, deleting the container from the virtual pool.

13. The method of claim 12, wherein the container comprises an isolated execution environment for executing the client code.

14. The method of claim 12, comprising classifying the request as one of a synchronous request and an asynchronous request.

15. The method of claim 14, comprising classifying the request as one of as a priority request and a non-priority request.

16. The method of claim 15, wherein the plurality of queues comprises a plurality of priority queues and a plurality of non-priority queues and the request is stored in the selected queue based on a priority.

17. The method of claim 16, wherein the plurality of queues comprises at least one priority synchronous queue, at least one priority asynchronous queue, at least one non-priority synchronous queue, and at least one priority asynchronous queue, and the request is stored in the selected queue based on the priority determined at runtime using a binary classifier and whether the request is synchronous or asynchronous.

18. The method of claim 17, wherein each queue of the plurality of queues comprises a plurality of shards, each shard to store requests received from a selected plurality of clients.

19. The method of claim 16, wherein determining the selected one of the plurality of queues is based on a real time data model and an historical data model.

20. The method of claim 12, wherein maintaining the virtual pool of containers comprises assigning and initializing a plurality of new containers from a container pool, requesting connections to the new containers, getting handles for the new containers, starting pings to the new containers, and keeping the handles of the new containers in the virtual pool, when the virtual pool needs to be replenished.

21. The method of claim 20, wherein allocating the container from the virtual pool for the request comprises removing the handle for the container from the virtual pool, starting a handshake with the container, and passing the request including the client code to the container.

22. At least one tangible machine-readable medium comprising a plurality of instructions that in response to being executed by a processor in a computing system cause the processor to:

maintain a virtual pool of containers;

predictively allocate, based on historical data models, one or more containers for usage ahead of receiving requests for usage of the one or more containers, wherein the one or more containers are ephemeral containers;

receive a request from a client for one of a plurality of services to performed;

when the request includes client code, store the request in a selected one of a plurality of queues, wherein selection of one of the plurality of queues is based on the historical data models;

get the request from the selected one of the plurality of queues and assign a container among the one or more containers predictively allocated for the request from the virtual pool of containers, the client code to be executed in the container, and the container has not previously executed any request; and responsive to completion of execution of the client code in the container, delete the container from the virtual pool.

23. The at least one tangible machine-readable medium of claim 22, wherein the container comprises an isolated execution environment for executing the client code.

24. The at least one tangible machine-readable medium of claim 22, comprising instructions to classify the request as one of a synchronous request and an asynchronous request.

25. The at least one tangible machine-readable medium of claim 24, comprising instructions to classify the request as one of as a priority request and a non-priority request.

26. The at least one tangible machine-readable medium of claim 25, wherein the plurality of queues comprises a plurality of priority queues and a plurality of non-priority queues and the request is stored in the selected queue based on a priority.

27. The at least one tangible machine-readable medium of claim 26, wherein the plurality of queues comprises at least one priority synchronous queue, at least one priority asynchronous queue, at least one non-priority synchronous queue, and at least one priority asynchronous queue, and the request is stored in the selected queue based on the priority determined at runtime using a binary classifier and whether the request is synchronous or asynchronous.

* * * * *